United States Patent Office 3,038,913
Patented June 12, 1962

3,038,913
9α-HYDROXYLATION OF Δ⁴-3-KETO PREGNANE SERIES STEROIDS BY FUNGI OF THE CUNNINGHAMELLA AND HELICOSTYLUM GENERA
Arthur R. Hanze, Kalamazoo, Herbert C. Murray, Barry Township, Barry County, and Oldrich K. Sebek, Kalamazoo, Mich., assignors to The Upjohn Company, Kalamazoo, Mich., a corporation of Michigan
No Drawing. Filed Nov. 14, 1958, Ser. No. 773,844
7 Claims. (Cl. 260—397.45)

This invention relates to a method for the microbiological oxygenation of steroids and to the novel compounds thus produced. More particularly, it relates to a process for the conversion of a 9α-hydrogen-11-hydroxy steroid of the pregnane series to a 9α-hydroxy steroid by the oxygenating activity of a species of fungus selected from the genera consisting of Cunninghamella and Helicostylum.

A preferred aspect of this invention involves subjecting 11β,21-dihydroxy-4,17(20)-pregnadien-3-one or a 21-hydrocarbon carboxylic acid ester thereof (U.S. 2,844,604) to the oxygenating activity of a species of fungus of the genera Cunninghamella or Helicostylum to produce 9α,21-dihydroxy-4,17(20)-pregnadiene-3,11-dione. This compound can be converted to the known, physiologically active 9α-hydroxycortisone acetate [Fried et al., J. Am. Chem. Soc., 79, 1130 (1957)] by oxidative hydroxylation, after conversion to its 21-acetate, with osmium tetroxide and an oxidant according to the methods of U.S. Patents 2,769,823 and 2,769,825, and as exemplified hereinafter.

The oxygenating fungi employed in the process of this invention are species of genus Cunninghamella, which is of the family Choanephoraceae and the order Mucorales, and species of the genus Helicostylum, which is in the family Thamnidiaceae, also of the order Mucorales. These genera are well identified and typical species are available from culture collections, e.g., American Type Culture Collection. Species of fungi which can be employed in the process of this invention include *C. blakesleeana*, *C. elegans*, *C. verticullata*, *C. echinulata*, *C. bertholletiae* and *H. piriforme*.

The use of these fungi in the microbiological conversion of certain steroids is already known in the art. In U.S. 2,602,769, an example of the hydroxylation of an 11-methylene steroid with *Cunninghamella blakesleeana* is given. U.S. 2,812,286 describes the 11α-hydroxylation of 11-methylene steroids with *Cunninghamella echinulata*. An example of an 8- and a 14-hydroxylation of an 11-methylene steroid with *Helicostylum piriforme* is disclosed in U.S. Patents 2,703,806, 2,602,769 and 2,670,358. The 9-hydroxylation of an 11-hydroxy steroid with a fungus employed in the process of this invention was heretofore unknown. These fungi are within the order of fungi employed in the process of U.S. 2,602,769 but their use in bioconverting an 11-hydroxy steroid to produce a 9α-hydroxy-11-keto steroid is not described therein. The present process provides a method of producing the physiologically active 9α-hydroxy-cortisone and its 21-esters, or intermediates in the production thereof without employing the relatively expensive hydrocortisone acetate as an intermediate. Instead, 11β,21-dihydroxy-4,17(20)-pregnadien-3-one and its esters, which are now readily prepared from progesterone (U.S. 2,844,604), can be employed.

Starting compounds for the process of this invention are 9α-hydrogen-11-hydroxy steroids of the pregnane series, preferably steroids of the 11β-hydroxy pregnane series. Especially preferred are Δ⁴-3-keto-9-hydrogen-11β-hydroxy steroids of the pregnane series. The starting steroid, for example, may contain the angular methyl groups characteristic of most steroids, a methyl group at the 2, 6, 7, 16, 17 and 21 positions; halogen, e.g., a fluorine at 2, 4, 6, 16 and 21; a hydroxy or acyloxy group at 1, 3, 5, 6, 7, 8, 12, 14, 15, 16, 17, and 21; a keto at 3, 6, 7, 12, 16, and 20; a double bond at 1, 4, 5, 6, 7, 14, 16, 17(20) and 20 positions; and other groups at other positions on the molecule, e.g., cyano, alkoxy, maleic anhydride adduct, epoxy, carboalkoxy, carboxy, vinyl, ethinyl, aldehydic and lactone groups.

The starting pregnane series steroids having the 9α-hydrogen-11-hydroxy group include the progesterones, pregnenolones, pregnanes, pregnenes, pregnadienes and pregnatriens. Preferred are the Δ⁴-3-ketopregnenes. The 11β-hydroxy steroids are the preferred starting compounds, being oxidized in most instances in the process of this invention to 11-ketosteroids.

The 9α-hydroxy-11-oxygenated products of the process of this invention comprise a large number of physiologically active members (see British Patent 777,996; U.S. 2,840,572; 2,840,578, 2,840,599 and 2,840,580), e.g., 9α-hydroxycortisone which possesses anti-inflammatory activity. Other compounds produced in this process, i.e., those without the Δ⁴-3-keto group or the 20-keto group in the pregnane series can be converted into compounds of the progesterone, i.e., Δ⁴-3,20-diketo, series by reactions well known in the art.

In carrying out the process of this invention, the selected starting steroid substrate comprising 9α-hydrogen-11-hydroxy steroid as defined hereinabove and substantially free from 11-methylene steroid is subjected to the oxygenating activity of a culture of fungi of the genera Cunninghamella or Helicostylum, preferably under aerobic, agitated submerged fermentation conditions in a nutrient medium, i.e., containing assimilable nitrogen, carbohydrate and preferably also phosphorus. "Steroid substrate" defines the added steroid and does not include the steroids naturally produced by the fungus itself. The fungus is preferably grown for some time, e.g., 24–48 hours, before the addition of the steroid substrate. After the addition of the steroid, the fermentation conditions are preferably continued for several hours, e.g., 24 hours or more, before separating the steroid conversion products. For a complete discussion of a variety of fermentation conditions, see U.S. 2,602,769.

The steroid conversion products are preferably isolated by extraction of the fermentation mycelium and beer with solvent. For example, the mycelium is filtered and washed with acetone and the beer is extracted with methylene chloride or other water-immiscible solvent. Ordinarily, the largest proportion of steroid conversion product is found in the mycelium.

The extracted steroids can then be purified by the usual techniques, e.g., fractional crystallization or chromatography, according to techniques well known in the art.

The following examples are illustrative of the process and products of the present invention but are not to be construed as limiting.

EXAMPLE 1

*9α,21-Dihydroxy-4,17(20)-[Cis]-Pregnadiene-3,11-Dione*

A fermentor containing 100 l. of a sterile medium at pH 4.9, made from commercial dextrose (10 g. per liter) and corn steep solids (20 g. per liter) was inoculated with 5 l. of vegetative growth of *Helicostylum piriforme* Bain (A.T.C.C. 8992). After 24 hours of vigorous agitation and aeration at a rate of 2.0 l. per minute, 20.0 g. of 11β,21-dihydroxy-4,17(20)-[cis]-pregnadien-3-one (U.S. 2,844,604) was added as a solution in 500 ml. of acetone and the fermentation was continued for 48 hours under the same conditions. The conversion products were extracted according to the method of D. H. Peterson et al., J. Am. Chem. Soc., 74, 5933 (1952), to give about 42 g. of semicrystalline residue which was dissolved in about 1 l. of dry methylene chloride and chromatographed over 2 kg. of magnesium silicate (Florisil). The column was developed with six 2-1. portions of each of the following solvent compositions: hexanes (Skellysolve B) plus 18% acetone, hexanes plus 20% acetone, hexanes plus 25% acetone and hexanes plus 50% acetone. The residues from fractions 9–21, counting the methylene cloride fraction, were combined, dissolved in hot acetone, decolorized with 2 g. of charcoal (Darco G–60), filtered and the filtrate concentrated until copious crystallization occurred. The mixture was cooled in a refrigerator for 2–3 hours and then filtered to give 10.33 g. of 9α,21-dihydroxy-4,17(20)-[cis]-pregnadiene-3,11-dione melting at 217–219° C. Additional crops were collected until 12.31 g. were obtained, which were recrystallized from acetone to give 9α,21-dihydroxy-4,17(20)-[cis]-pregnadiene-3,11-dione melting at 219.5–221° C., having an $[\alpha]_D$ of +173° in dioxane, a $\lambda_{max}^{alc.}$ of 238.5 mµ ($a_M$ 15,725), $\nu_{max}^{Nujol}$ 3440, 3330, 1700, 1640 and 1605 cm.$^{-1}$ and the analysis below.

Calcd. for $C_{21}H_{28}O_4$: C, 73.22; H, 8.19. Found: C, 73.32; H, 8.30.

EXAMPLE 2

*9α,21-Dihydroxy-4,17(20)-[Cis]-Pregnadiene-3,11-Dione*

12 l. of a sterile medium consisting of 1.2% corn steep solids and 1.0% of commercial grade dextrose (Cerelose) having a pH of 4.7 was inoculated with 600 ml. of a 72-hour growth of *Cunninghamella blakesleeana* (A.T.C.C. 8688a) grown in the same medium. The fermentation mixture was aerated at a rate of 0.5 l. of air per minute and agitated vigorously with revolving paddles. After 24 hours, the pH was 4.4. To this mixture was added 3.0 g. of 11β,21-dihydroxy-4,17(20)-[cis]-pregnadien-3-one in 30 ml. of hot propylene glycol and aeration and agitation was continued for 24 hours. Then the contents of the fermentor were extracted several times with methylene chloride.

The 9α,21-dihydroxy-4,17(20)-[cis]-pregnadiene-3,11-dione was isolated from the beer extract in the manner described in Example 1 and its identity with the 9α,21-dihydroxy-4,17(20)-[cis]-pregnadiene-3,11-dione obtained according to the method of Example 1 was established.

Following the procedure of Examples 1 and 2, 11α,21-dihydroxy-4,17(20)-[trans]-pregnadien-3-one is converted to 9α,21-dihydroxy-4,17(20)-[trans]-pregnadiene-3,11-dione, 11α-hydroxyprogesterone is converted to 9α,11α-dihydroxyprogesterone, 11α-hydroxyprogesterone is converted to 9α-hydroxy-11-ketoprogesterone, 11β,21-dihydroxyprogesterone 21-acetate is converted to 9α,21-dihydroxy-11-ketoprogesterone, hydrocortisone acetate is converted to 9α-hydroxycortisone, 11β,17α-dihydroxyprogesterone is converted to 9α,17α-dihydroxy-11-ketoprogesterone, 11β-hydroxypregnane-3,20-dione is converted to 9α-hydroxypregnane-3,11,20-trione, 3α,11β,17α-trihydroxy-pregnan-20-one is converted to 3α,9α,17α-trihydroxypregnane-11,20-dione, 3β,11β,17α-trihydroxypregnan-20-one is converted to 3β,9α,17α-trihydroxypregnane-11,20-dione, 11β,17α,21-trihydroxyallopregnane-3,20-dione is converted to 9α,17α,21-trihydroxyallopregnane-3,11,20-trione, 11β,21dihydroxy-allopregnane-3,20-dione is converted to 9α,21-dihydroxyallo-pregnane-3,11,20-trione, 11β,17α-dihydroxyallopregnane-3,20-dione is converted to 9α,17α-dihydroxyallopregnane-3,11,20-trione and 3α,11β,21-trihydroxyallopregnane-3,20-dione is converted to 3α,9α,21-trihydroxyallopregnane-3,11,20-trione.

*9α,21-Dihydroxy-4,17(20)-[Cis]-Pregnadiene-3,11-Dione 21-Acetate*

To a solution of 5.0 g. of 9α,21-dihydroxy-4,17(20)-[cis]-pregnadiene-3,11-dione in 15 ml. of dry pyridine at 20° C. was added 15 ml. of acetic anhydride. After 17 hours at room temperature, the solution was poured into 450 ml. of a mixture of ice and water. The crystalline product which precipitated was filtered, washed well with water and dried. There was obtained 5.53 g. of 9α,21-dihydroxy-4,17(20)-[cis]-pregnadiene-3,11-dione 21-acetate melting at 172.5–177° C. Recrystallization of these crystals from 70 ml. of hot acetone, which was filtered and then concentrated on a steam bath until crystallization occurred, raised the melting point to 188.5–190° C. These crystals had an $[\alpha]_D$ of +160° in acetone, a $\lambda_{max}^{alc.}$ of 239 mµ ($a_M$ 15,750) a $\nu_{max}^{Nujol}$ 3390, 1725, 1700, 1652, 1240, and 1224 cm.$^{-1}$ and the analysis below.

Calcd. for $C_{23}H_{30}O_5$: C, 71.48; H, 7.82. Found: C, 71.42; H, 8.19.

*9α,17α,21-Trihydroxy-4-Pregnene-3,11,20-Trione 21-Acetate*

To an ice-cold solution of 387 mg. (1 mM.) of 9α,21-dihydroxy-4,17(20)-[cis]-pregnadiene-3,11-dione 21-acetate in 18.5 ml. of tertiary butyl alcohol containing 0.93 ml. of pyridine and 0.185 ml. of water was added 370 mg. of N-methylmorpholine oxide, 800 mg. of phenyl iodosoacetate and 4.0 mg. of osmium tetroxide. The slurry was stirred for 2 days at 0–5° C. 600 mg. of filter aid (Magnesol) was added followed by a solution of 150 mg. of sodium sulfite in 10 ml. of water. The resulting mixture was stirred at room temperature for 15 minutes. The mixture was filtered and the filtrate concentrated at reduced pressure until the first trace of precipitation occurred. The solution was clarified with a minimum of tertiary butyl alcohol and stirred at room temperature for one hour. The resulting precipitate was filtered and washed with tertiary butyl alcohol, water and then dried. There was obtained 245 mg. of 9α,17α,21-trihydroxy-4-pregnene-3,11,20-trione 21 - acetate melting at 233–236° C. A polymorphic modification was obtained which melted at 212–214° C. Recrystallization from a mixture of acetone and hexanes (Skellysolve B) raised the melting point to 237–239° C.; $[\alpha]_D$+227° in chloroform, $\lambda_{max}^{alc.}$ 239 mµ, $a_M$ 15,900

We claim:

1. A process for the production of 9α-hydroxy steroids which comprises subjecting a steroid substrate comprising 9α-hydrogen-11-hydroxypregnane series steroid and substantially free from 11-methylene steroid to the oxygenating activity of a culture of a member of the group consisting of fungi of the genus Cunninghamella and separating the thus produced 9α-hydroxy-11-oxygenated steroid from the conversion products.

2. The process of claim 1 wherein the fungus is Cunninghamella and the starting steroid is a Δ$^4$-3-keto pregnane series steroid.

3. The process of claim 1 wherein the fungus is *Cunninghamella blakesleeana* and the starting steroid is a Δ$^4$-3-keto pregnane series steroid.

4. A process for the production of a 9α-hydroxy-11-ketosteroid which comprises subjecting 11β,21-dihydroxy-4,17(20)-[cis]-pregnadien-3-one to the oxygenating activity of a culture of *Helicostylum piriforme* and separating the thus-produced 9α,21-dihydroxy-4,17(20)-[cis]-pregnadiene-3,11-dione.

5. A process for the production of a 9α-hydroxy-11-ketosteroid which comprises subjecting 11β,21-dihydroxy-4,17(20)-[cis]-pregnadien-3-one to the oxygenating activity of a culture of *Cunninghamella blakesleeana* and separating the thus-produced 9α,21-dihydroxy-4,17(20)-[cis]-pregnadiene-3,11-dione.

6. 9α,21-dihydroxy-4,17(20)-pregnadiene-3,11-dione.

7. 9α,21-dihydroxy-4,17(20)-[cis]-pregnadiene - 3,11-dione.

References Cited in the file of this patent

UNITED STATES PATENTS

| | | |
|---|---|---|
| 2,695,260 | Murray | Nov. 23, 1954 |
| 2,745,851 | Mooradian | May 15, 1956 |
| 2,745,852 | Ehrhart | May 15, 1956 |
| 2,756,179 | Fried | July 24, 1956 |
| 2,777,864 | Bernstein | Jan. 15, 1957 |
| 2,840,578 | Perlman et al. | June 24, 1958 |
| 2,840,580 | Perlman et al. | June 24, 1958 |
| 2,844,604 | Hogg | July 22, 1958 |
| 2,900,400 | Gould et al. | Aug. 18, 1959 |

OTHER REFERENCES

Wettstein: Experientia, vol. 11, #12, pages 465–504 (1955).

Eppstein et al.: J.A.C.S., vol. 80, pages 3382–89, July 5, 1958.

UNITED STATES PATENT OFFICE
CERTIFICATE OF CORRECTION

Patent No. 3,038,913　　　　　　　　　　　　　　　　June 12, 1962

Arthur R. Hanze et al.

It is hereby certified that error appears in the above numbered patent requiring correction and that the said Letters Patent should read as corrected below.

Column 3, line 49, for "11α" read -- 11β --; line 53, for "11α", second occurrence, read -- 11β --.

Signed and sealed this 13th day of November 1962.

(SEAL)
Attest:

ERNEST W. SWIDER
Attesting Officer

DAVID L. LADD
Commissioner of Patents